(12) United States Patent
Peng et al.

(10) Patent No.: US 8,781,030 B2
(45) Date of Patent: *Jul. 15, 2014

(54) FULLY COMPENSATED ADAPTIVE INTERFERENCE CANCELLATION SYSTEM

(71) Applicant: Comtech EF Data Corp., Tempe, AZ (US)

(72) Inventors: Lianfeng Peng, Gilbert, AZ (US); Lazaro F. Cajegas, III, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/686,316

(22) Filed: Nov. 27, 2012

(65) Prior Publication Data

US 2013/0083917 A1 Apr. 4, 2013

Related U.S. Application Data

(63) Continuation of application No. 12/778,032, filed on May 11, 2010, now Pat. No. 8,320,504.

(60) Provisional application No. 61/177,231, filed on May 11, 2009.

(51) Int. Cl.
*H03D 3/24* (2006.01)
*H03D 1/06* (2006.01)
*H04B 1/10* (2006.01)

(52) U.S. Cl.
USPC ........................... 375/327; 375/346; 375/350

(58) Field of Classification Search
CPC ...... H04B 1/10; H04B 1/1018; H04B 1/1027; H04B 2001/10; H04B 2001/1027; H04L 7/033; H04L 7/0331; H04L 7/0337; H04L 25/03044; H04L 25/03063; H04L 25/03273; H04L 25/0328; H04L 27/148; H04L 27/152; H04L 27/2272; H04L 27/2275; H04L 27/2331; H04L 27/2334
USPC ......... 375/324–327, 332, 345, 346, 350, 355; 329/304, 307, 308; 455/67.13, 67.16, 455/68, 232.1, 234.1

See application file for complete search history.

(56) References Cited

U.S. PATENT DOCUMENTS

| 7,209,716 | B2 | 4/2007 | Maeda et al. |
| 2001/0006539 | A1 | 7/2001 | Kim |
| 2002/0197958 | A1 | 12/2002 | Collins et al. |
| 2004/0165687 | A1* | 8/2004 | Webster et al. ............... 375/350 |
| 2009/0110047 | A1 | 4/2009 | Lai et al. |
| 2009/0122203 | A1* | 5/2009 | Spalink et al. ................ 348/726 |

* cited by examiner

*Primary Examiner* — Young T. Tse
(74) *Attorney, Agent, or Firm* — Booth Udall Fuller, PLC

(57) ABSTRACT

A system for removing interference comprising a receive decimation filter that accepts a composite received baseband signal and generates filtered sampled data at a decimation rate, a transmit decimation filter that accepts a digitally converted replica of an interfering signal and generates filtered sampled data at a decimation rate, an integer sample delay control (ISDC) that provides multiple sample delay control for the replica and stores an estimated delay value, an adaptive filter that provides fractional sample delay control for the replica of the interfering signal and optimizes cancellation of the interfering signal, a digital phase-locked loop (DPLL) programmed with a known frequency offset of the interfering signal that tracks a phase and frequency of the replica of the interfering signal, an automatic gain control (AGC) that maintains near full scale operation of adaptive filtering and the DPLL, and a slicer, mixer, and delay unit forming an error estimator.

28 Claims, 9 Drawing Sheets

Novel Adaptive Interference Cancellation System

FULLY COMPENSATED ADAPTIVE INTERFERENCE CANCELLATION SYSTEM

CROSS REFERENCE TO RELATED APPLICATIONS

This document is a continuation application of U.S. patent application Ser. No. 12/778,032, entitled "Fully Compensated Adaptive Interference Cancellation System" to Lianfeng Peng et al. which was filed on May 11, 2010, which application claims the benefit of the filing date of U.S. Provisional Patent Application No. 61/177,231, entitled "Fully Compensated Adaptive Interference Cancellation System" to Lianfeng Peng et al. which was filed on May 11, 2009, the disclosures of which are hereby incorporated entirely herein by reference.

BACKGROUND

1. Technical Field

Aspects of this document relate generally to telecommunication systems and methods for signal interference cancellation for data transmission through a telecommunication channel.

2. Background Art

Conventional telecommunications systems utilize circuitry relating to interference cancellation such as that described in U.S. Publication No. 2002/0197958A1 (www.p-todirect.com/publication/?20020197958) which is herein incorporated by reference in its entirety. Conventional circuits have the following disadvantages:

a) The adaptive filter or least mean square (LMS) equalizer operates far from full scale which results in reduced precision and accuracy in cancellation performance. While the conventional circuit does have a front-end automatic gain control (AGC), this AGC optimizes only the analog-to-digital (A/D) dynamic range which is commonly implemented in digital communications systems.

b) The adaptive filter is only capable of correcting a limited range of phase errors just as the digital phase locked loop (DPLL) is which therefore results in the adaptive FIR filter and the DPLL having an increased chance of phase correction conflict.

c) When the adaptive filter has more taps (i.e. more than 11 taps), the phase tracking capability of the DPLL is slow, making adaptation more difficult.

d) The delay tracking capability is poor because when there is a delay handover from the adaptive equalizer to the delay manager, there is no practical way for the DPLL to adjust to the change immediately. This leads to difficulty in tracking a high Doppler rate of change.

e) The adaptive FIR filter has to be complex because phase and frequency correction of the interference is done before the adaptive FIR filter. In applications where spectrum linear distortion is minimal, the complex adaptive FIR filter requires unnecessary extra resources.

U.S. Pat. No. 4,736,455, which is herein incorporated by reference in its entirety, includes another example of a conventional interference cancellation system. Like the above described conventional interference cancellation system, implementations of the present interference cancellation system may be used in multiple carrier frequency reuse communications systems, such as satellite communications systems.

SUMMARY

Implementations of telecommunication systems like those disclosed in this document may include implementations of a system for removing interference from a composite received baseband signal comprising a receive decimation filter that accepts the composite received baseband signal and generates filtered sampled data at a decimation rate wherein the composite received baseband signal comprises a desired signal and an interfering signal, a transmit decimation filter that accepts a digitally converted replica of the interfering signal and generates filtered sampled data at a decimation rate and an integer sample delay control (ISDC) that provides multiple sample delay control for the replica of the interfering signal and stores an estimated delay value. The system further comprises an adaptive filter that provides fractional sample delay control for the replica of the interfering signal and optimizes cancellation of the interfering signal present in the composite received baseband signal, a digital phase-locked loop (DPLL) programmed with a known frequency offset of the interfering signal that tracks a phase and frequency of the replica of the interfering signal, an automatic gain control (AGC) that maintains near full scale operation of adaptive filtering and the DPLL, a slicer which is effectively a subtractor, and an error estimator which is formed by the slicer, a mixer and a delay unit.

Particular implementations may include one or more of the following. The estimated delay value corresponds to a delay difference between the interfering signal and the replica of the interfering signal. The DPLL is located after the adaptive filter. The adaptive filter uses a least mean square (LMS) algorithm and a finite impulse response (FIR) filter.

The integer sample delay control (ISDC) further comprises a computer readable medium that stores a complex sample of the replica of the interfering signal and a multiple sample delay control mechanism.

The computer readable medium uses double data rate synchronous dynamic random access memory (SDRAM) or any memory device capable of storing the sample data.

The adaptive filter further comprises a finite impulse response (FIR) filter. The FIR filter can be a real or complex FIR filter, and may be configured to switch between a real and a complex FIR filter.

The DPLL further comprises a phase detector that includes an arctangent function and a complex multiplier, a second order loop filter or a third order loop filter, an adder that accepts an initial frequency offset and an output of the loop filter, and a complex numerical controlled oscillator (NCO) that accepts a sum of the initial frequency offset and the output of the loop filter and provides a complex sinusoidal output.

The AGC further comprises an FIR coefficient calculator that sums the LMS coefficients and determines an absolute value of the sum, a subtractor that calculates a difference between the absolute value and a target gain, a multiplier to scale the difference, and an integrator that accumulates the scaled difference.

The error estimator further comprises a complex multiplier that accepts a complex conjugate of a delayed output of the complex NCO and an output of the slicer to update the LMS coefficients.

In another aspect, implementations of an interference cancellation may further provide for a method for removing interference from a composite received baseband signal comprising accepting, by a receive decimation filter, the composite received baseband signal wherein the composite received baseband signal comprises a desired signal and an interfering signal, generating, by the receive decimation filter, filtered sampled data at a decimation rate, and accepting, by a transmit decimation filter, a digitally converted replica of the interfering signal. The method further comprises generating, by a the transmit decimation filter, filtered sampled data at a decimation rate, providing, by an integer sample delay control (ISDC), multiple sample delay control for the replica of the interfering signal, storing, by the integer sample delay control (ISDC), an estimated delay value, providing, by an adaptive filter, fractional sample delay control for the replica of the interfering signal, optimizing, by the adaptive filter, cancellation of the interfering signal present in the composite received baseband signal, tracking, by a digital phase-locked loop (DPLL) that is programmed with a known frequency offset of the interfering signal, a phase and frequency of the replica of the interfering signal, maintaining, by an automatic gain control (AGC), near full scale operation of adaptive filtering and the DPLL, and updating an adaptive filter coefficient by an error estimator having a conjugate multiplier and a slicer.

Particular implementations may include one or more of the following. The estimated delay value corresponds to a delay difference between the interfering signal and the replica of the interfering signal. The DPLL is located after the adaptive filter. A least mean square (LMS) algorithm and a finite impulse response (FIR) filter is used. The adaptive filter further comprises a finite impulse response (FIR) filter. The FIR filter can be a real or complex FIR filter, and may be configured to switch between a real and a complex FIR filter. The method further comprises storing by the integer sample delay control (ISDC) on a computer readable medium, a complex sample of the replica of the interfering signal and providing a multiple sample delay control mechanism.

The method further comprises using, by the computer readable medium, double data rate synchronous dynamic random access memory (SDRAM) or any memory device capable of storing sample data.

The adaptive filter further comprises a finite impulse response (FIR) filter. The FIR filter can be a real or complex FIR filter, and may be configured to switch between a real and a complex FIR filter. The tracking by the DPLL further comprises detecting a phase using an arctangent function and a complex multiplier, determining estimated loop parameters based on a sampling rate for a second order loop filter or a third order loop filter, accepting, by an adder, an initial frequency offset and an output of the loop filter, accepting, by a complex numerical controlled oscillator (NCO), a sum of the initial frequency offset and the output of the loop filter; and providing, by the complex NCO, a complex sinusoidal output.

Maintaining, by an automatic gain control (AGC) further comprises summing, by an FIR coefficient calculator, the LMS coefficients, determining, by the FIR coefficient calculator, an absolute value of the sum, calculating, by a subtractor, a difference between the absolute value and a target gain, scaling the difference by a multiplier; and accumulating, by an integrator, the scaled difference.

Updating an adaptive filter coefficient by the error estimator further comprises accepting, by a complex multiplier, a complex conjugate of a delayed output of the complex NCO and an output of the slicer to update the LMS coefficients.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended interference cancellation system and/or assembly procedures for a telecommunication system using interference cancellation will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such telecommunication systems using interference cancellation and implementing components, consistent with the intended operation.

Implementations of interference cancellation systems as provided in this disclosure improve the performance of conventional interference cancelling systems and may be implemented with the use of a field-programmable gate array (FPGA), digital signal processor (DSP), or general purpose processor which is capable of using most digital signal processing techniques.

It is assumed that the initial delay and frequency offset estimations of the undesired signal relative to its replica are known. These initial parameters can be determined using some known algorithms found in literatures, such as described by Stein, "Algorithms for Ambiguity Function Processing", IEEE Transactions on Acoustics, Speech, and Signal Processing, Vol. ASSP-29, No. 3, pp 588-599, June 1981, which is hereby incorporated entirely by this reference.

Implementations of the interference cancellation systems disclosed herein may operate on baseband or near baseband signals wherein analog signals are converted to digital samples for signal processing. The cancellation of the interfering signal from the composite received signal employs digital signal processing (DSP) techniques such as adaptive filtering or equalization, which can be easily implemented in FPGA's, DSP's, or a general purpose processor.

This disclosure also provides a method and system for canceling the interfering signal from the composite received signal containing the undesired signal and desired signal, wherein the digital phase-locked loop (DPLL) does not intervene with the adaptive equalizer in terms of phase tracking capability and delay tracking capability. Hence it improves delay tracking performance at high Doppler rate of change for satellite applications. It also allows use of the real adaptive filter instead of the complex one if applicable in a particular application, which substantially reduces the required resource.

In other aspects, this disclosure provides for a method and system for improving the cancellation performance by providing automatic gain control (AGC) that is driven by the adaptive filter (or LMS equalizer) in order to operate nearly full scale in digital form.

Figure 1:
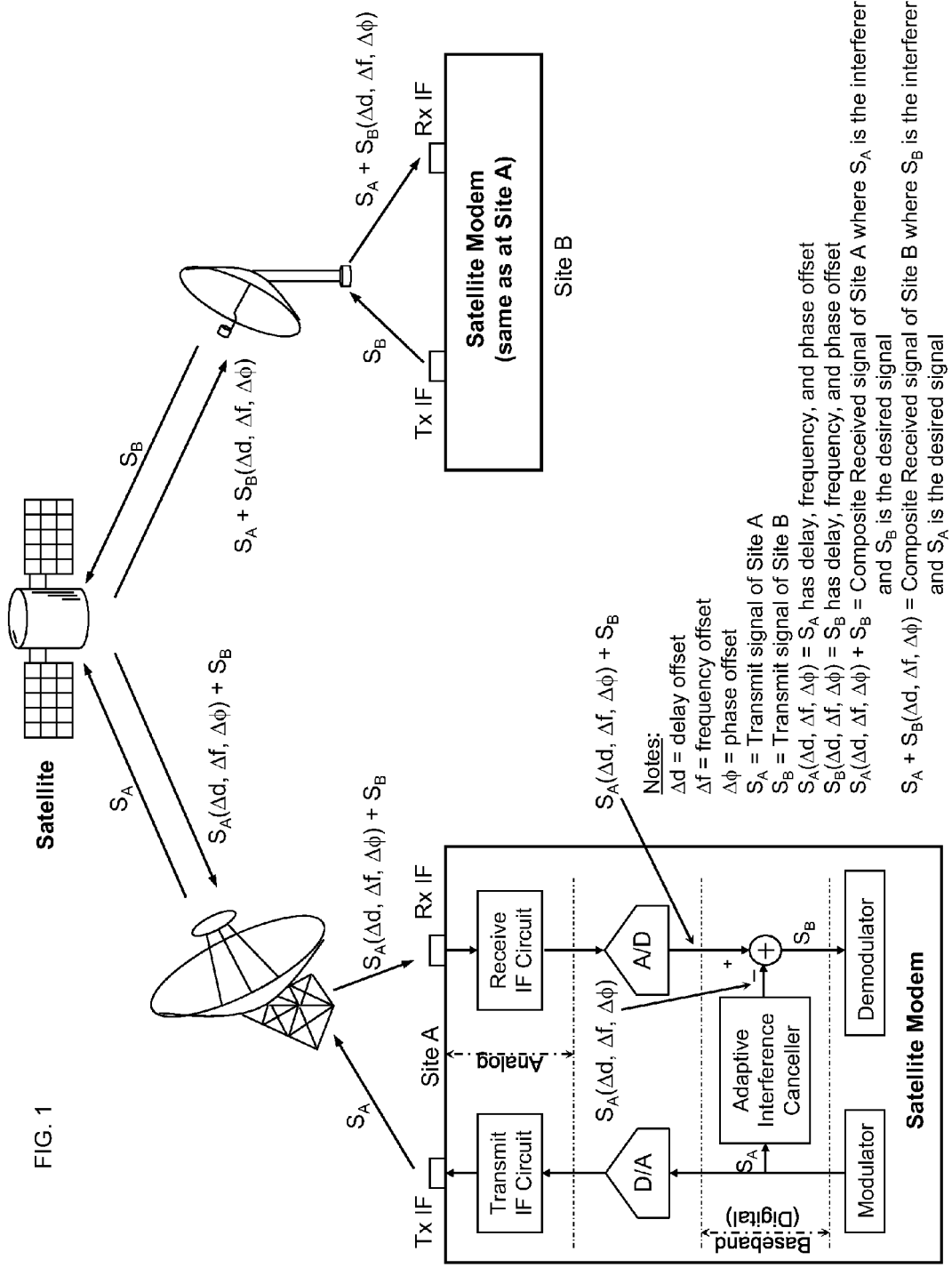
FIG. 1 depicts a satellite communication system with an adaptive interference cancellation system.

Unlike conventional interference cancellation systems, this disclosure and related implementations may be embedded in a digital communications system containing a modulator and demodulator such as a satellite modem as shown in FIG. 1, but may also be implemented as a separate component similar to that which is found in the conventional system and may be utilized in any wireless or wired communication system such as, for example, a cellular communications network.

FIG. 1 depicts a satellite communications system having an adaptive interference cancellation system embedded within the satellite modem. In this diagram, the radio frequency (RF) equipments such as up converter, down converter, high-power amplifier, and low-noise amplifier are omitted for simplicity of illustration. As shown in the diagram, the adaptive interference canceller mimics the delay, frequency, and phase offsets as well as the amplitude (not shown) of the interfering signal contained in a composite received signal to a replica of the interfering signal. In this diagram for example at Site A, $S_A$ is the replica of the interfering signal, while $S_A(\Delta d,\Delta f,\Delta\phi)+S_B$ is the composite received signal containing the interfering signal $S_A(\Delta d,\Delta f,\Delta\phi)$ having delay offset ($\Delta d$), frequency offset ($\Delta f$), and phase offset ($\Delta\phi$) and the desired signal $S_B$.

Figure 2:
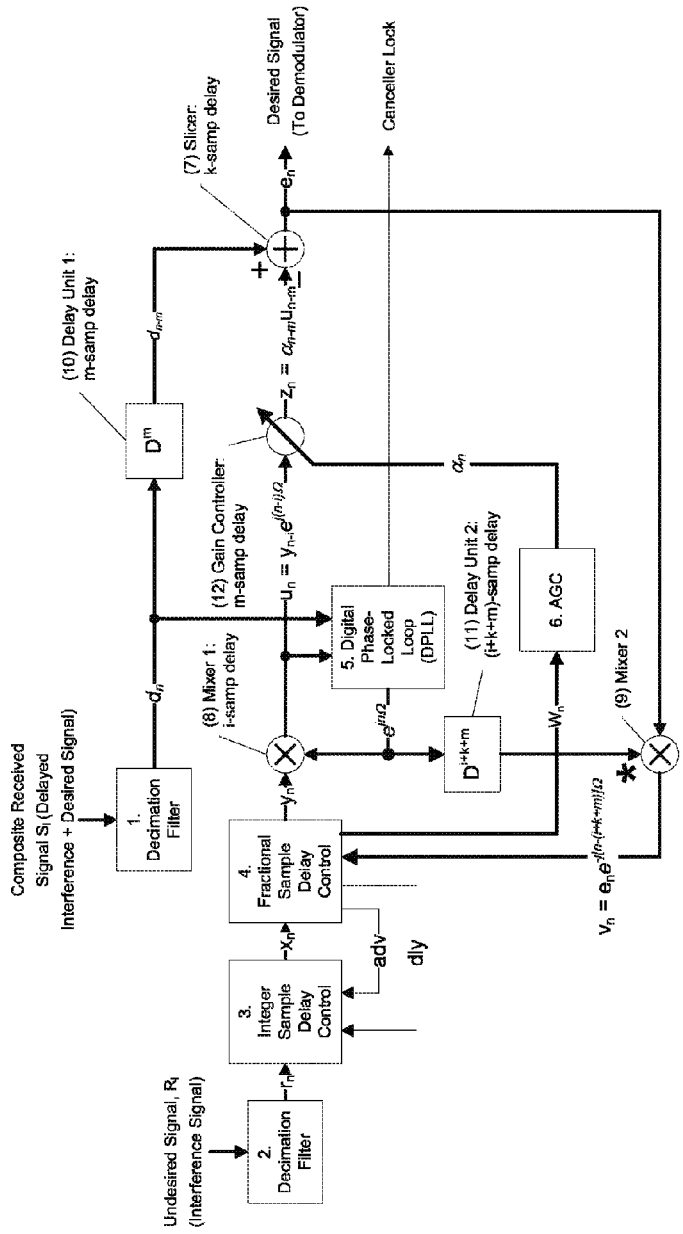
FIG. 2 is a block diagram of an adaptive interference cancellation system architecture.

FIG. 2 illustrates an implementation of an adaptive interference cancellation system. The system comprises a receive decimation filter 1 and a transmit decimation filter 2 which may be identical in configuration, an Integer Sample Delay Control (ISDC) 3 that handles delay of integer multiple samples, a Fractional Sample Delay Control (FSDC) 4 that uses an adaptive filter to handle fractional sample delay (delay less than one sample), a Digital Phase-Locked Loop (DPLL) 5, an Automatic Gain Control (AGC) 6, two mixers (Mixers 1 & 2) 8, 9 which are effectively two complex multipliers, a Gain Controller 12, a Slicer 7 and two matching delay elements (Delay Units 1 & 2). The Slicer 7, Mixer 2, 9 and Delay Unit 2, 11 form an error estimator. Transmit decimation filter 2 is used to filter an interfering signal or a replica of an interfering signal and receive decimation filter 1 is used to filter the composite received signal to achieve a required sampling or decimation rate. Provided that both decimation filters 1, 2 are identical, the replica of the interfering signal mimics the filtered characteristics of the interfering signal contained in the composite received signal. The decimation filters may be implemented with any known digital filters which can decimate digital signals from one sample rate to another. A commonly used and simple one is the cascaded integrator-comb (CIC) filter, although one of ordinary skill in the art would recognize that any appropriate decimation filter may also be used.

The ISDC 3 stores an initial delay estimate and delays the interference signal in integer multiple samples during operation. The FSDC 4 may use a least mean square (LMS) adaptive equalizer to track fractional sample delay wherein the delay is less than one sample. It consistently monitors the mass center of the LMS finite impulse response (FIR) coefficients' power. When the mass center has shifted by one tap or more, FSDC 4 signals ISDC 3 to advance or delay the interference signal by one sample and shifts the LMS coefficients accordingly to accommodate this shift in the interference signal. This event is called delay handover.

As shown in FIG. 2, phase and frequency correction of the interference signal by the DPLL 5 is done after the FSDC 4, where delay of the interference has been matched to that in the composite received signal. Because the delay handover from the FSDC 4 to ISDC 3 is completely transparent to the DPLL 5, the handover is thus smoother and implementation is simpler and easier than in the conventional circuits as found in the prior art. Delay tracking capability is also substantially improved.

Another advantage of locating the DPLL 5 after the FSDC 4 is that the FSDC 4 may use a real adaptive equalizer if a complex adaptive equalizer is unnecessary in particular applications, which is impossible in the conventional circuits of the prior art. This is advantageous because a real adaptive equalizer uses far fewer resources than a complex adaptive equalizer.

The DPLL 5 may be a second-order or third-order loop, depending on the particular applications, and its initial frequency estimate is assumed to be loaded prior to running the digital phase-locked loop (DPLL). The DPLL phase detector uses a complex multiplier with one complex conjugate input from the rotated FSDC output and another complex input from composite received signal, and an arctangent function. It is possible to provide low-pass filtered or smoothed samples before and/or after the arctangent function. The DPLL lock is used as an indication of the canceller lock.

The purpose of the AGC 6 is, among other things, to isolate the processing signal level before the slicer from the composite received signal level, so that the adaptive equalizer in the FSDC 4 and DPLL 5 can operate at a selectable, desired level, which is as near full scale as possible. It accomplishes this goal by maintaining the adaptive equalizer gain at a selectable, desired level. It substantially improves the cancellation performance and contributes to the increasing delay tracking capability. In a particular implementation, near full scale is typically at about 70% of full scale, but may be set higher or lower depending upon the needs of particular applications.

Figure 3:
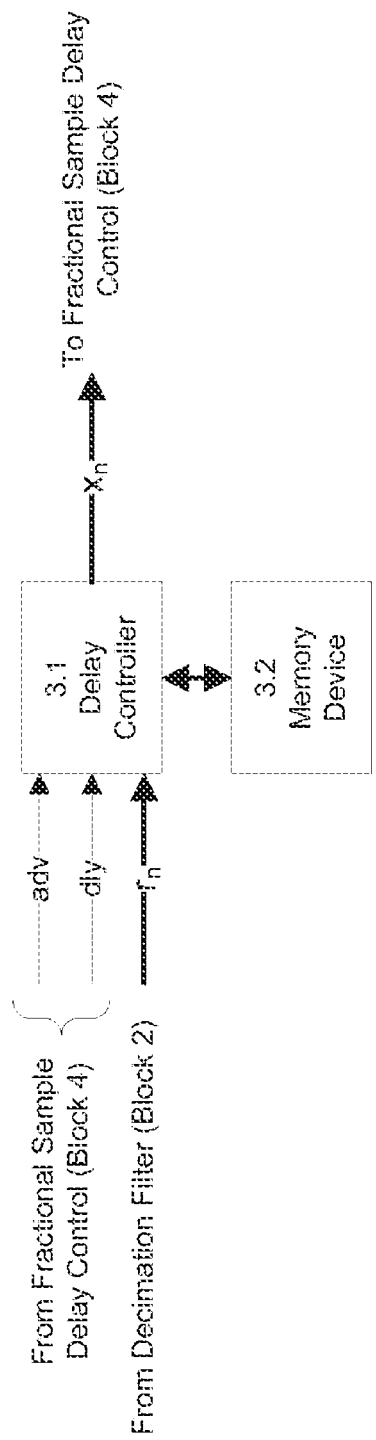
FIG. 3 is a block diagram of an implementation of an integer sample delay control (ISDC)

As illustrated in FIG. 3, an implementation of the integer sample delay control (ISDC) 3 comprises two major functional blocks: a delay control 3.1 and a memory device 3.2. While delay control 3.1 can be implemented inside a field programmable gate array (FPGA), digital signal processor (DSP) or general purpose processor, the memory device 3.2 is usually implemented with an external physical memory device such as, but not limited to DDR or DDR2.

The ISDC 3 delays the interference by integer multiple samples. The initial delay is estimated and loaded. During operation, when it receives Advance (adv) signal from the fractional sample delay control (FSDC), it reduces the delay by one sample. On the other hand, when the ISDC receives Delay (dly) signal from the FSDC 4, it increases the delay by one sample.

Figure 4:
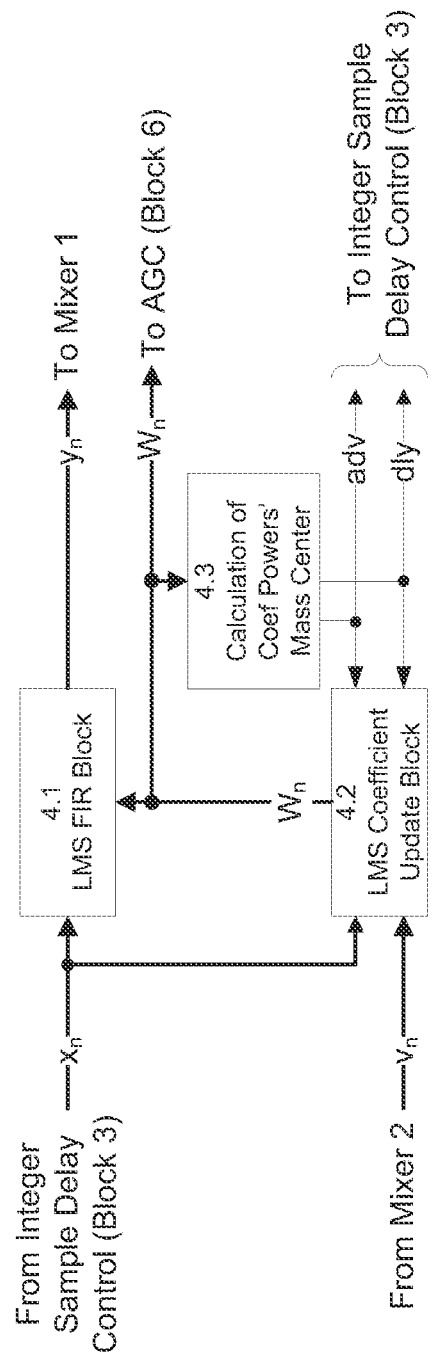
FIG. 4 is block diagram of an implementation of a fractional sample delay control (FSDC)

As shown in FIG. 4, the FSDC 4 comprises three major functional blocks. It uses an LMS adaptive equalizer, which is comprised of an LMS FIR block 4.1 and an LMS coefficient update block 4.2, to track delay in a fractional sample (less than one sample). Calculation of coefficient powers' center of mass 4.3 consistently monitors the mass center of the FIR coefficients' power and generates Advance (adv) and Delay (dly) signals to LMS coefficient update block 4.2 and the ISDC 3 to shift the coefficients and interference samples.

The following derivation shows how the LMS coefficients or weights should be updated with introduction of Mixer 18 and Gain Controller 12. For simplicity of derivation, the delay in Mixer 1, Gain Controller, and Slicer have been omitted.

$$y_n = W_{n-1}{}^T X_n \quad \text{Equation 1}$$

$$e_n = d_n - \alpha_n y_n e^{jn\Omega} = d_n - W_{n-1}{}^T X_n (\alpha_n e^{jn\Omega}) \quad \text{Equation 2}$$

Where $\alpha_n$ is the AGC gain, and $X_n$ and $W_n$ are the input and LMS weight vectors, respectively:

$$X_n = (x_n, x_{n-1} \ldots x_{n-(L-1)})^T \quad \text{Equation 3}$$

$$W_n = (w_{0,n}, w_{1,n} \ldots w_{L-1,n})^T \quad \text{Equation 4}$$

L is the number of the LMS taps. Now the input to the complex LMS can be treated as $Z_n$:

$$Z_n = X_n(\alpha_n e^{jn\Omega}) \quad \text{Equation 5}$$

$$e_n = d_n - \alpha_n y_n e^{jn\Omega} = d_n - W_{n-1}{}^T Z_n \quad \text{Equation 6}$$

Then the weight update becomes that $$W_n = W_{n-1} + \mu e_n Z_n^* = \\ W_{n-1} + \mu e_n((\alpha_n e^{jn\Omega}) X_n)^* = W_{n-1} + \mu(\alpha_n e_n e^{-jn\Omega}) X_n^* \quad \text{Equation 7}$$

To simplify implementation and save resource, the LMS weight update can be done with the sign of $e_n$ as long as the adaptation constant $\mu$ is smaller enough. Because AGC gain $\alpha_n$ is real and positive, $\alpha_n e_n$ doesn't change the sign of $e_n$. Therefore, $$W_n = W_{n-1} + \mu(\alpha_n e_n e^{-jn\Omega}) X_n^* = W_{n-1} + \mu(e_n e^{-jn\Omega}) X_n^* = W_{n-1} + \mu v_n X_n^* \quad \text{Equation 8}$$

Where $v_n$ is the input to the FSDC as shown in FIG. 2:

$$v_n = e_n e^{-jn\Omega} \quad \text{Equation 9}$$

The offset center of mass (CoM) of the FIR coefficients' power is calculated as $$CoM_n = \frac{\sum_{i=1}^{L-1} i |w_{i,n}|^2}{\sum_{i=0}^{L-1} |w_{i,n}|^2} - \frac{L-1}{2} \quad \text{Equation 10}$$

CoM takes values between +/−0.5(L−1). If CoM<0, delay leans towards decreasing. If CoM>0, delay leans toward increasing. When CoM<=−1, Block 4.3 generates Advance and $W_n$ shifts down by one tap. When CoM>=1, it generates Delay and $W_n$ shifts up by one tap.

In hardware implementation, it is likely that pipeline exists to increase the processing speed. Therefore, pipeline is likely introduced in Mixer 1, Gain Controller and Slicer. The LMS algorithm requires exactly match in sample delay. This is the purpose of Delay Units 1 and 2 as shown in FIG. 2.

Though the main function of the adaptive equalizer is to track fractional delay (delay less than one sample), the complex adaptive equalizer can also compensate linear distortion in the interference in the composite received signal. However, in applications where the linear distortion is minimal, the compensation may not be necessary. In that case, a real adaptive equalizer can be used instead of a complex adaptive equalizer. The real adaptive equalizer uses only half the multipliers that the complex one of the same impulse response length uses, resulting in saving substantial resources in implementation.

If the real adaptive equalizer is used, Wn is a real vector and its update is defined as $$W_n = W_{n-1} + \mu Re(v_n X_n^*) \quad \text{Equation 11}$$

In summary, the FSDC algorithm is as follows.
LMS FIR Block:

$$y_n = W_{n-1}{}^T X_n \quad \text{Equation 12}$$

Complex LMS Coefficient Update Block:

$$W_n = W_{n-1} + \mu v_n X_n^* \quad \text{Equation 13}$$

Real LMS Coefficient Update Block:

$$W_n = W_{n-1} + \mu Re(v_n X_n^*) \quad \text{Equation 14}$$

Advance adv=1, shift down:

$$W_n = (0, w_{0,n-1} \ldots w_{L-2,n-1})^T \quad \text{Equation 15}$$

Delay dly=1, shift up:

$$W_n = (w_{1,n}, w_{2,n} \ldots w_{L-1,n}, 0)^T \quad \text{Equation 16}$$

Figure 5:
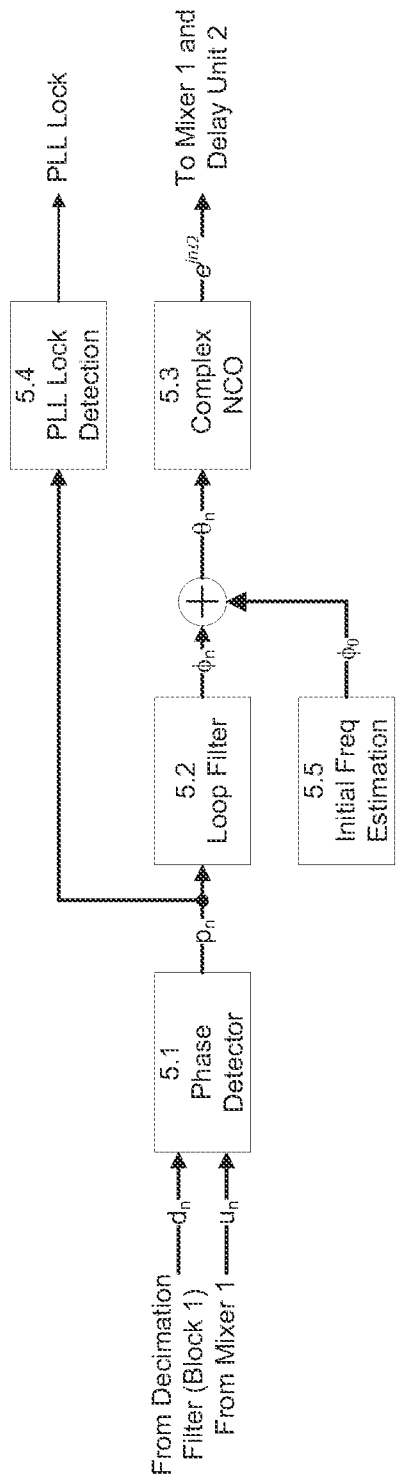
FIG. 5 is a block diagram of an implementation of a digital phase-locked loop (DPLL)

The DPLL is a typical digital phase-locked loop having Phase Detector 5.1, Loop Filter 5.2, Complex NCO 5.3, PLL Lock Detection 5.4, and Initial Frequency Estimation 5.5 as shown in FIG. 5. The loop can be the second or third order loop depending on particular applications. In some applications where up and down converters have large frequency drift, the third-order DPLL may be required to operate at low symbol rates.

Figure 6:
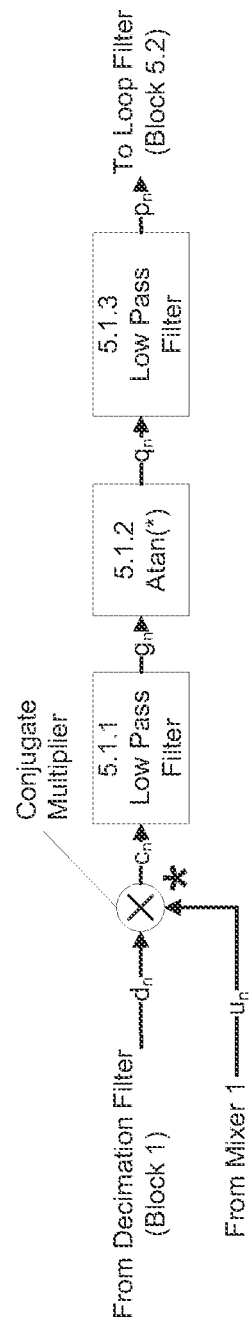
FIG. 6 is a block diagram of an implementation of a phase detector.

One implementation of the phase detector is shown in FIG. 6. The two input $d_n$ and $u_n$ are conjugate-multiplied to generate the phase difference as the phase of $c_n$:

$$c_n = d_n u_n^* \quad \text{Equation 17}$$

The real and imaginary parts of $c_n$ run through two identical low pass filters, respectively, in the Low Pass Filter block 5.1.1. The complex output $g_n$ runs through an arctangent function 5.1.2 to calculate the phase difference $q_n$ between $d_n$ and $u_n$. $q_n$ can run through another low pass filter 5.1.3 to further smooth the phase difference as output $p_n$.

One commonly used PLL lock detection method is to average the absolute value of the phase detector output. When the PLL is locked, the average absolute value of the phase detector output is relatively small and thus, can be used as PLL lock indication when the average absolute value is below a predetermined threshold.

Figure 7:
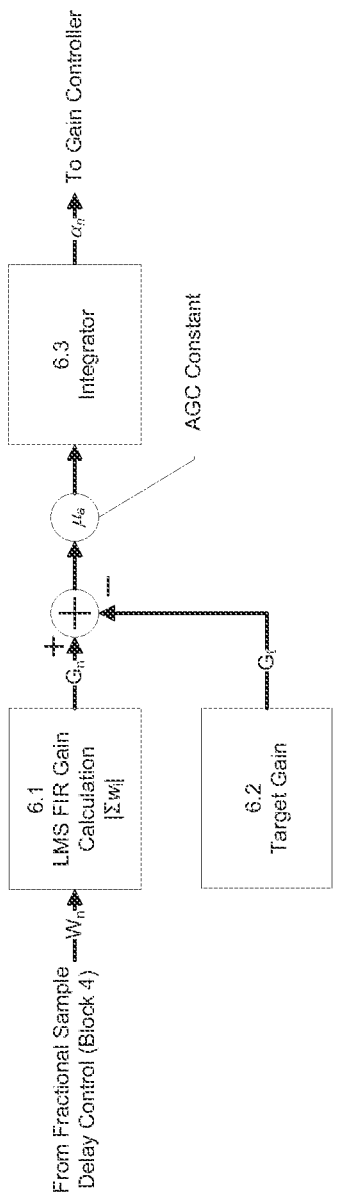
FIG. 7 is a block diagram of an implementation of an automatic gain control (AGC)

The AGC as shown in FIG. 7 regulates the level of $z_n$ to match $d_n$, so that the circuitry before Gain Controller can operate at a level we see as proper and independent of $d_n$. The AGC accomplishes this by keeping the LMS FIR gain at a desired level we choose.

The LMS FIR gain calculation 6.1 is defined by Equation 18.

$$G_n = \left| \sum_{i=0}^{L-1} w_{i,n} \right| \quad \text{Equation 18}$$

The AGC gain $\alpha_n$ is updated by Equation 19 as seen in FIG. 7.

$$\alpha_n = \alpha_{n-1} + \mu_a (G_n - G_t) \quad \text{Equation 19}$$

Where $G_t$ is the target LMS FIR gain 6.2 and $\mu_a$ is the AGC constant controlling how sensitive the AGC gain $\alpha_n$ is to the LMS FIR gain change prior to reaching the Integrator 6.3. The AGC constant $\mu_a$ should be less than 10% of the LMS adaptation constant $\mu$ to avoid disturbance to the LMS adaptation.

Figure 8:
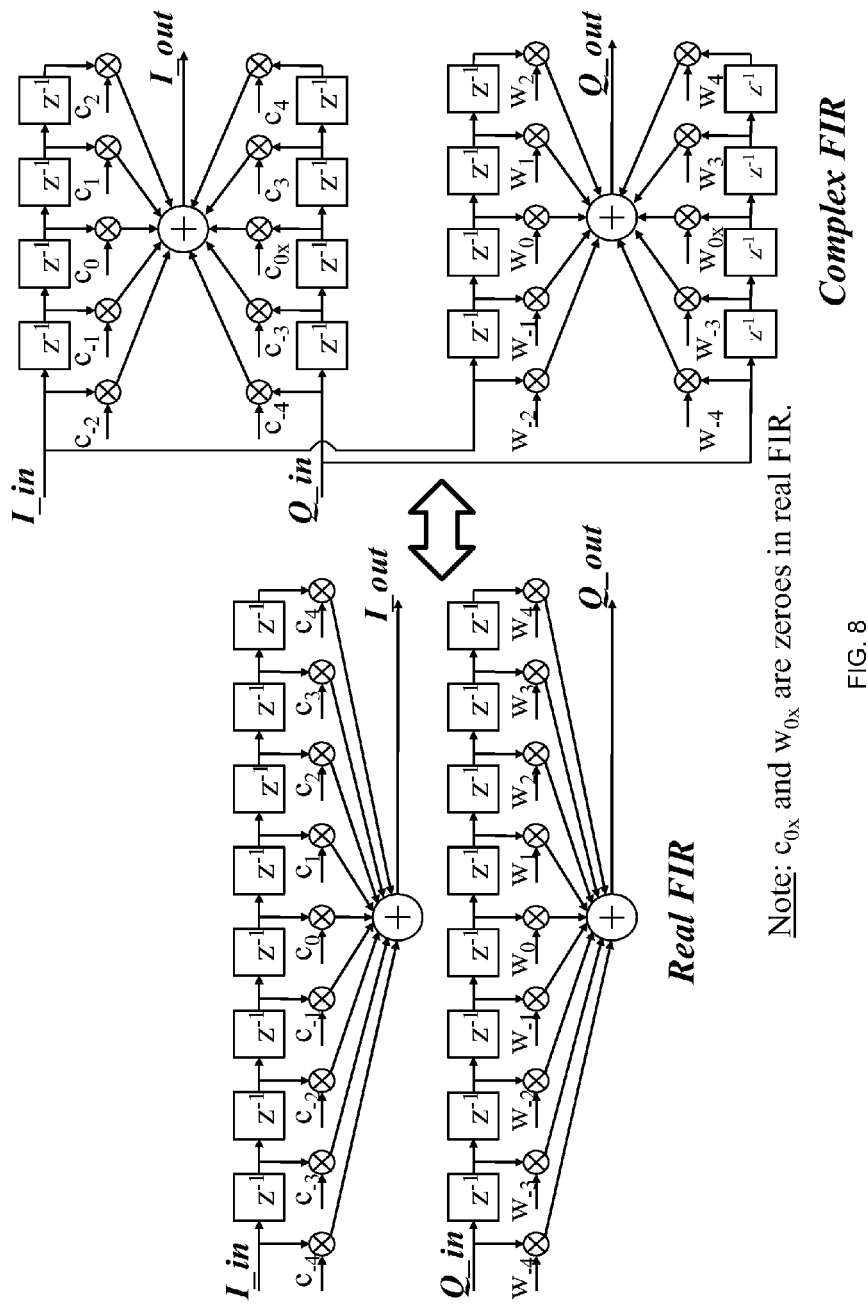
FIG. 8 is a block diagram of an implementation of a finite impulse response (FIR) filter.

When using a configuration that allows use of a real adaptive equalizer, the LMS equalizer can be configured as switchable between real FIR and complex FIR as shown in FIG. 8 to maximize delay acquisition range with the same amount of resources. During initial acquisition (acquisition mode), the LMS equalizer can be configured as real FIR which has the advantage of long taps to have a larger acquisition range of the signal delay. After acquisition is done, the LMS equalizer switches to complex FIR to track the signal delay and phase (tracking mode).

Figure 9:
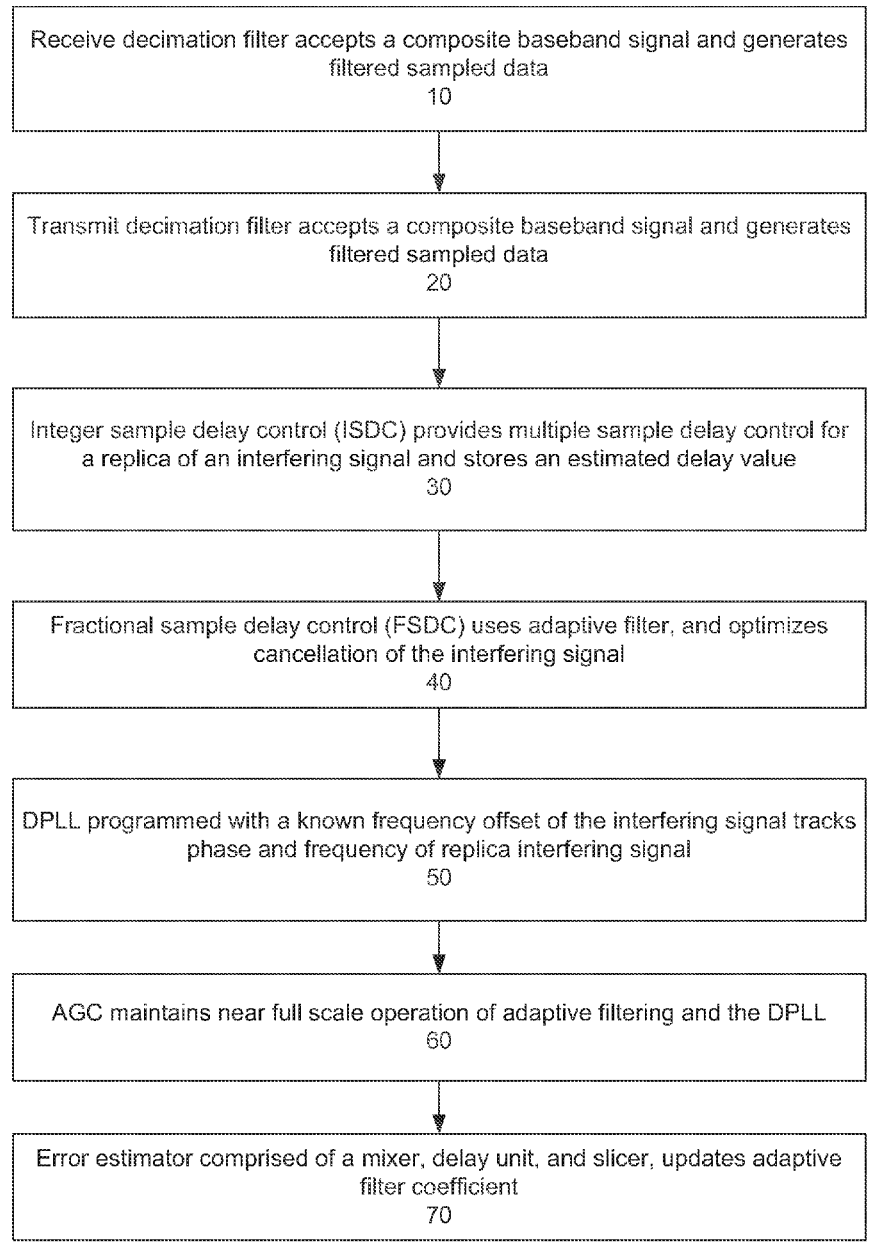
FIG. 9 is a block diagram of a method of adaptive interference cancellation.

As shown in FIG. 9, the present disclosure also provides for methods of interference cancellation that involve a receive decimation filter accepting the composite received baseband signal and generating filtered sampled data at a decimation rate 10. A transmit decimation filter also accepts a digitally converted replica of the interfering signal and generates filtered sampled data at a decimation rate 20. An integer sample delay control (ISDC) provides multiple sample delay control for the replica of an interfering signal and stores an estimated delay value 30. An adaptive filter, such as that found in a fractional sample delay control (FSDC), assists in optimizing cancellation of the interfering signal that is present in the composite received baseband signal 40. A DPLL that that is programmed with a known frequency offset of the interfering signal tracks a phase and frequency of the replica of the interfering signal 50 and an AGC is used to maintain near full scale operation of adaptive filtering and the DPLL. An error estimator that is comprised of a mixer, a delay unit, and a slicer then updates the adaptive filter coefficient.

In places where the description above refers to particular implementations of adaptive interference cancellation systems, it should be readily apparent that a number of modifications may be made without departing from the spirit thereof and that these implementations may be applied to other telecommunication systems having adaptive interference cancellation systems.

We claim:

1. A system for removing interference from a composite received baseband signal comprising:
    an integer sample delay control (ISDC) configured to provide multiple sample delay control for a replica of an interfering signal and store an estimated delay value;
    an adaptive filter coupled to the ISDC and configured to provide fractional sample delay control for the replica of the interfering signal and optimize cancellation of the interfering signal present in the composite received baseband signal that comprises the interfering signal and a desired signal;
    a digital phase-locked loop (DPLL) coupled to the adaptive filter and programmed with a known frequency offset of the interfering signal that tracks a phase and frequency of the replica of the interfering signal;
    an automatic gain control (AGC) coupled to the adaptive filter and configured to maintain near full scale operation of adaptive filtering and the DPLL; and
    an error estimator comprising a mixer, a delay unit, and a slicer configured to update a coefficient of the adaptive filter.

2. The system of claim 1 wherein the estimated delay value corresponds to a delay difference between the interfering signal and the replica of the interfering signal.

3. The system of claim 1 wherein the DPLL is located after the adaptive filter.

4. The system of claim 1 wherein the adaptive filter uses a least mean square (LMS) adaptive equalizer comprising a finite impulse response (FIR) filter.

5. The system of claim 4 wherein the FIR filter comprises a real FIR filter.

6. The system of claim 4 wherein the FIR filter comprises a complex FIR filter.

7. The system of claim 4 wherein the FIR filter is configured to switch between a real FIR filter and a complex FIR filter.

8. The system of claim 7 wherein the FIR filter switches between operating as a real FIR and a complex FIR when the adaptive filter is in a tracking mode.

9. The system of claim 1 wherein the ISDC comprises:
    a computer readable medium that stores a complex sample of the replica of the interfering signal; and
    a multiple sample delay control mechanism configured to delay the replica of the interfering signal.

10. The system of claim 9 wherein the computer readable medium comprises a memory.

11. The system of claim 1 wherein the adaptive filter comprises a finite impulse response (FIR) filter.

12. The system of claim 1 wherein the DPLL comprises:
    a phase detector that includes an arctangent function and a complex multiplier;
    a second order loop filter or third order loop filter coupled to the phase detector having estimated loop parameters that are based on a sampling rate;
    an adder that accepts an initial frequency offset and an output of the loop filter; and
    a complex numerical controlled oscillator (NCO) that accepts a sum of the initial frequency offset and the output of the loop filter and provides a complex sinusoidal output.

13. The system of claim 1 wherein the AGC comprises:
    an FIR coefficient calculator that sums LMS coefficients and determines an absolute value of the sum;
    a subtractor that calculates a difference between the absolute value and a target gain;
    a multiplier to scale the difference; and
    an integrator that accumulates the scaled difference.

14. The system of claim 1 wherein the error estimator further comprises:
    a complex multiplier that accepts a complex conjugate of a delayed output of a complex NCO and an output of the slicer to update a LMS coefficient.

15. A method for removing interference from a composite received baseband signal comprising:
    providing, by an integer sample delay control (ISDC), multiple sample delay control for a replica of an interfering signal;
    storing, by the ISDC, an estimated delay value;
    providing, by an adaptive filter coupled to the integer sample delay control, fractional sample delay control for the replica of the interfering signal;
    optimizing, by the adaptive filter, cancellation of the interfering signal present in the composite received baseband signal comprised of the interfering signal and a desired signal;
    tracking, by a digital phase-locked loop (DPLL) that is programmed with a known frequency offset of the interfering signal, a phase and frequency of the replica of the interfering signal;
    maintaining, by an automatic gain control (AGC), near full scale operation of adaptive filtering and the DPLL; and
    updating an adaptive filter coefficient of the adaptive filter by an error estimator which comprises a mixer, a delay unit, and a slicer.

16. The method of claim 15 wherein the estimated delay value corresponds to a delay difference between the interfering signal and the replica of the interfering signal.

17. The method of claim 15 further comprising locating the DPLL after the adaptive filter and independent from the adaptive filter.

18. The method of claim 15 further comprising filtering by the adaptive filter by applying a least mean square (LMS) adaptive equalizer comprising a finite impulse response (FIR) filter.

19. The method of claim 18 wherein the FIR filter comprises a real FIR filter.

20. The method of claim 18 wherein the FIR filter comprises a complex FIR filter.

21. The method of claim 18 wherein the FIR filter is configured to switch between a real FIR filter and a complex FIR filter.

22. The method of claim 15 further comprising:
storing by the ISDC on a computer readable medium, a complex sample of the replica of the interfering signal; and
providing a multiple sample delay control mechanism configured to delay the replica of the interfering signal.

23. The method of claim 22 further comprising using, by the computer readable medium, double data rate synchronous dynamic random access memory (SDRAM) or a memory device capable of storing sample data.

24. The method of claim 15 wherein the adaptive filter further comprises a finite impulse response (FIR) filter.

25. The method of claim 24 wherein the FIR filter switches between operating as a real FIR filter and a complex FIR when the adaptive filter is in a tracking mode.

26. The method of claim 15 wherein the tracking by the DPLL comprises:
detecting a phase using an arctangent function and a complex multiplier;
determining estimated loop parameters based on a sampling rate for a second order loop filter or a third order loop filter and the detected phase;
accepting, by an adder, an initial frequency offset and an output of the second order loop filter or the third order loop filter;
accepting, by a complex numerical controlled oscillator (NCO), a sum of the initial frequency offset and the output of the second order loop filter; and
providing, by the complex NCO, a complex sinusoidal output.

27. The method of claim 15 wherein the maintaining, by the AGC comprises:
summing, by an FIR coefficient calculator, LMS coefficients;
determining, by the FIR coefficient calculator, an absolute value of the sum;
calculating, by a subtractor, a difference between the absolute value and a target gain;
scaling the difference by a multiplier; and
accumulating, by an integrator, the scaled difference.

28. The method of claim 27 wherein updating the adaptive filter coefficient by the error estimator comprises:
accepting, by a complex multiplier, a complex conjugate of a delayed output of the complex NCO and an output of the slicer to update the LMS coefficients.

* * * * *

UNITED STATES PATENT AND TRADEMARK OFFICE
CERTIFICATE OF CORRECTION

Page 1 of 1

PATENT NO. : 8,781,030 B2
APPLICATION NO. : 13/686316
DATED : July 15, 2014
INVENTOR(S) : Lianfeng Peng and Lazaro F. Cajegas, III It is certified that error appears in the above-identified patent and that said Letters Patent is hereby corrected as shown below:

In the Claims:

COLUMN 11 LINES 22-23

Please amend Claim 24:

From:

24. The method of claim 15 wherein the adaptive filter further comprises a finite impulse response (FIR) filter.

To:

24. The method of claim 15 wherein the adaptive filter comprises a finite impulse response (FIR) filter.

Signed and Sealed this
Sixth Day of January, 2015

Michelle K. Lee
*Deputy Director of the United States Patent and Trademark Office*